Patented Feb. 7, 1939

2,146,083

UNITED STATES PATENT OFFICE 2,146,083

PREPARATION FOR THE TREATMENT OF DISEASES IN FOWL AND ANIMALS

Grover C. Miller, Alhambra, Calif., assignor to Kelp-Ol Laboratories, Inc., Los Angeles, Calif., a corporation of California No Drawing. Application March 5, 1935, Serial No. 9,387

4 Claims. (Cl. 167—53.1)

This invention relates to a preparation for the treatment of disease of animals and fowl, particularly the treatment of coccidiosis in fowl. Heretofore many preparations, chemicals and mixtures of chemicals have been suggested and used for the treatment of diseases in fowl and animals, particularly in the treatment of such diseases as coccidiosis in chickens and other fowl, and the most commonly employed substance now in use for the treatment of coccidiosis in fowl is a lactose. In the treatment of fowl for coccidiosis with lactose, the lactose is converted into lactic acid in the crop, with the result that a rapid absorption of water occurs followed with the great physiological disturbance in the fowl particularly demonstrated by the large increase of water intake varying from 300% to 500% of the normal water intake, resulting in greatly increased kidney burden and other physiological disturbances. The effectiveness in the treatment of fowl or other animals with lactose or other substances which may be converted into lactic acid upon ingestion by the fowl or animal depends upon whether or not the lactic acid as produced from the substances reaches the point in the fowl where an increase of lactic acid is desired to produce the remedy for the disease. In fowl this point is apparently the lower bowel where are found the lactic acid bacilli which are most active in the presence of, and likewise act to produce lactic acid. The production of lactic acid in the crop of the fowl or chicken only serves to set up physiological disturbances and it is only such portion of the lactic acid as passes beyond the crop as actually acts to remedy the ailment in fowl. The quantity of lactic acid which will pass unprotected from the crop to the lower bowel is very slight so that in order to obtain any results from the feeding of fowl lactose, a considerable excess over and above that which would be required to effect the remedy is required. As a substance applicable for the commercial treatment of fowl, particularly chickens, must be inexpensive in character, it is likewise evident that the substance must be so prepared as to require only a small amount to be used per fowl in order to obtain the results desired.

It is therefore an object of this invention to produce a preparation for the treatment of disease in fowl or animals which is inexpensive and of which only a small amount is required to effect the results desired, and which substance contains lactic acid so protected that a major portion of the lactic acid of the substance is not released until it reaches the point where the application of lactic acid is desired in the system such, for example, as in the lower bowel of chickens or fowl.

Another object of this invention is to provide a preparation for the treatment of diseases in animals and fowl, including an absorbing medium in which lactic acid is absorbed, and a medium for the sealing of the lactic acid in the absorbing material so that the lactic acid is released gradually upon ingestion and so that the greater portion of the lactic acid absorbed in the absorbing material is actually released in the lower bowel or at the point where its particular application is desired in the system.

Other objects and advantages of this invention it is believed will be apparent from the following detailed description of a preferred embodiment thereof.

I have discovered that if lactic acid is absorbed in an absorbing material such, for example, as calcium lactate, bone meal, or other similar substances, and then sealed in the absorbing material so as to be released solely therefrom, that on ingestion of the preparation the lactic acid will be carried to the point in the system of the fowl or animal where its application is desired or required in order to combat the particular disease with which the animal or fowl is infected.

I have further found that as contradistinguished from feeding of lactose to fowl or other animals that the feeding of the medical preparation embodying my invention thereto does not result in as great a physiological disturbance being set up in the system of the fowl or animal as is particularly demonstrated by the fact that the fowl does not require, or there does not result in the fowl the great increase in water intake occasioned by the feeding of lactose thereto.

In the preparation of the preparation embodying my invention, and as illustrative thereof, I employ the following media in substantially the following proportions compounded in, or prepared in, the preferred manner as hereinafter set forth.

The preparation as an illustrative example may include

| | Pounds |
|---|---|
| Calcium lactate | 12¾ |
| Powdered elm | 6 |
| Lactic acid (85% solution) | 11 |
| Powdered acacia | 1 |
| Agar agar | 1½ |
| Water | 8 |
| White mineral oil | 9 |

The preparation is preferably combined by mixing the lactic acid with the calcium lactate until the lactic acid is absorbed thereby. The calcium lactate and gums, including the powdered elm and powdered acacia, are preferably mixed dry and the lactic acid is added thereto until the lactic acid is absorbed in the calcium lactate. The agar is dissolved in the water in which the lactic acid has previously been added to aid in the dissolving of the agar in the water. The entire mixture is then introduced into a mixing machine and thoroughly mixed. It is then dried to reduce the water content thereof until it will powder or may be granulated. After the drying the mineral oil is poured over the granules or powder and agitated with the powder in a mixing machine until the oil is thoroughly admixed therewith so that substantially all individual particles are covered with a film of mineral oil.

In the place of calcium lactate as set forth in the above preferred example, other absorbing materials may be employed such as bone meal, or the like. In the place of powdered elm and powdered acacia, as set forth, other gums may be employed. In the place of the lactic acid, other acids such as citric, malic, or other acids of a non-poisonous character may be employed, the purpose of the acid being to lower the fecal pH, and while lactic acid is preferred in that it is the natural acid produced by the lactic acid bacilli in practically any system, other acids may be substituted therefor with a similar result, the purpose of the lactic acid being to lower the pH of the system, as with the lowering of the pH of the system, or the increasing of the acid concentration thereof up to certain limits, the lactic acid bacilli flourishes more readily and acts to itself produce lactic acid in greater quantities.

The powdered elm, powdered acacia, or other gums, and the mineral oil and agar, are all employed for the purpose of protecting the lactic acid as absorbed by the absorbing material or for sealing the lactic acid within the absorbing material so that its release therefrom is gradual to thereby insure the delivery of the greater portion of the lactic acid to the lower bowel, as in the case of fowl, and likewise to increase the fecal bulk to sweep or cleanse the intestinal tracts of the animals or fowl.

The agar and mineral oil being both substances normally indigestible, both pass through the system substantially unaffected by the digestive secretions thereof and thereby act to effectively seal the lactic acid in the absorbing material. In a similar manner the gums act to protect the lactic acid or other acid as carried in the absorbing material.

As an illustrative example of the manner in which fowl have been treated by the preparation embodying my invention as hereinabove set forth as the preferred example thereof, the following is given:

In a flock of 250 pullets, what is commercially known as the "culls" therein were weeded out. There were 21 such culls which under normal circumstances, and prior to my invention, would have been expected to die. These 21 culls were treated with a mash of commercial grade to which there was mixed so that the mash and mixture of my preparation included 98% mash and 2% my preparation, the dosage for fowl being at the rate of approximately one-half teaspoon per chicken per day. This preparation was fed to the fowls for two consecutive days, following which for five consecutive days the fowl were fed with mash to which none of the preparation was added, and this treatment was continued for a period of several weeks with the result that although the 21 culls originally selected were, as far as visible signs showed, suffering from disease and from coccidiosis, that only one fowl died, and its death was not due to the disease from which it was suffering but from failure of its respiratory system to function properly. After the treatment of these pullets for several weeks it was found that all of the pullets started to lay. In order to determine the condition of the pullets, two of them were butchered for the purpose of determining their condition. It was found that they were suffering from no disease whatsoever, were fat and in perfect condition.

The physiological action of the preparation embodying my invention is upon ingestion apparently that in the crop the lactic acid is protected so that the abnormal increase in water consumption by the fowl or animal does not occur. Apparently the mucilaginous characteristics of the gums and protective material when acted upon by the secretions in the crop protects the lactic acid at this point so that the fowl does not suffer from the craving for water and so that the other physiological disturbances in the system of the fowl does not occur as when lactose is fed to the fowl. The same physiological action is observed in the treatment of cattle with the same preparation.

Having fully described my invention, it is to be understood that I do not wish to be limited to the details herein set forth, but my invention is of the full scope of the appended claims.

I claim:

1. A medical preparation particularly applicable for the treatment of disease in fowl, which includes an absorbing material, lactic acid absorbed in the absorbing material, a sealing material for sealing the lactic acid in the absorbing material, and the preparation being in dry form to form granules or a powder applicable for mixing with food for the fowl so that on ingestion of the preparation the lactic acid is carried into the lower bowel before complete release.

2. A medical preparation particularly applicable for the treatment of coccidiosis in fowl, which includes an absorbing material, lactic acid, a gum, mineral oil and agar thoroughly mixed when dried to produce a powder or granules.

3. A medical preparation particularly applicable for the treatment of disease in animals or fowl which includes lactic acid, calcium lactate, a gum, agar, mineral oil and water thoroughly mixed and dehydrated to produce a powder or granules.

4. A medical preparation particularly applicable for the treatment of disease in fowl or animals which includes bone meal, lactic acid and a sealing material for sealing the lactic acid in the bone meal so that on ingestion of the preparation the lactic acid is carried into the lower bowel before complete release.

GROVER C. MILLER.